D. Woodcock,
Jointing Staves.
Nº 8,976.    Patented May 25, 1852.
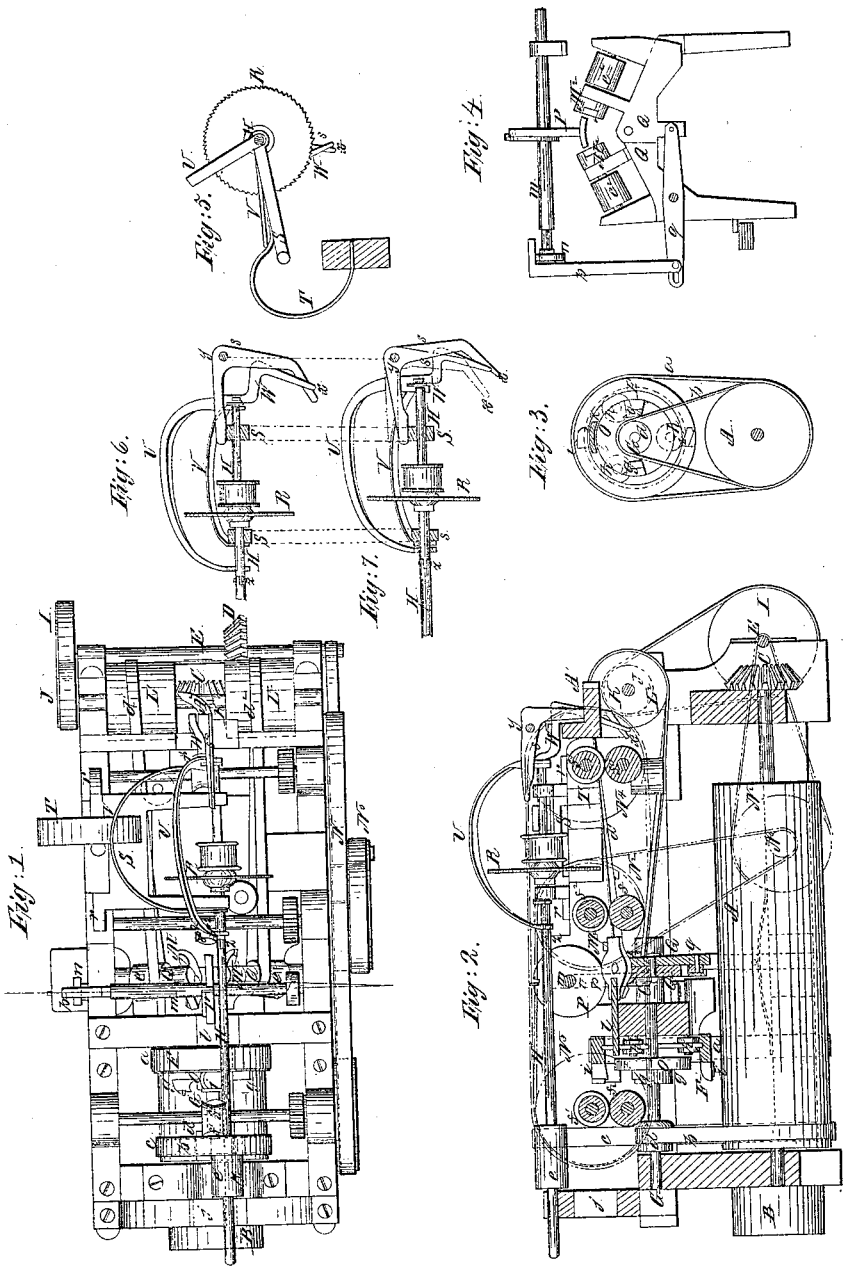

UNITED STATES PATENT OFFICE.

DENNISON WOODCOCK, OF INDEPENDENCE CENTRE, NEW YORK.

MACHINE FOR JOINTING STAVES.

Specification of Letters Patent No. 8,976, dated May 25, 1852.

*To all whom it may concern:*

Be it known that I, DENNISON WOODCOCK, of Independence Centre, in the county of Allegany and State of New York, have invented certain new and useful Improvements in Machines for Planing, Jointing, and Cutting Staves; and I do hereby declare that the following is a full, clear, and exact description of the same, reference being had to the accompanying drawings, forming part of this specification, in which—

Figure 1 is a plan. Fig. 2 is a vertical longitudinal section, taken for the most part centrally through the machine but representing some parts in full for the better illustration of the machine, and showing in red lines, the several driving pulleys and bands situated on that side of the machine which the section cuts off. Fig. 3 is a detached transverse view of the cutters and their operation for dressing or planing the staves. Fig. 4 is a similar view of the jointing cutters with the immediate parts operating and connected with them. Fig. 5 is a further like view of the circular saw (and accompanying parts) for cutting off the staves to their length.

The same letters of reference denote similar parts in each of the several figures.

To enable others skilled in the art to make and use my invention I will proceed fully to describe its construction and operation.

A is a revolving drum driven by the pulley B at its one end, and situated longitudinally in the center of the framing of the machine near the ground. It carries on the opposite end of its shaft, to which is the pulley B, a bevel wheel C, which gears into a similar wheel D, made fast to a shaft E, situated transversely with the machine. The drum A, operates by straps $a$, $b$, and $c$, the outer dressing wheel F and shafts G H through pulleys $d$, $e$. These motions operate the planing or dressing cutters and circular saw for cutting off the staves to their lengths, while the shaft E, also driven (through bevel gearing referred to) by the drums A, operates the feed or carrying rollers and jointing cutters, the pulley I on the shaft E giving motion to a smaller pulley J operating a shaft K which carries on it drums $L^1$, $L^2$, that through straps $d^1$ $d^2$ set in motion the jointing cutters $M^1$ $M^2$ through pulleys $e^1$, $e^2$, and the shaft E, further operates through pulleys $N^1$, $N^0$, $N^2$, $N^3$, $N^4$, the feed and carrying rollers $f^1$ $f^1$, $f^2$ $f^2$, $f^3$ $f^3$, the lower one of each pair of these rollers being also made to revolve through means of pinions on the roller spindles.

O, is the inner dressing wheel on the shaft G. It is provided with knives or cutters $g$, $g$, projecting from one side of the rim in front, the wheel O, revolving partly within and concentrically to the outer cutting wheel F, which is of ring form, being supported on bearing rollers $h$, $h$, $h$, that should be flanched or have a rib on their periphery working within a groove on the inside of the rim of the wheel F, to keep it in place; $i$, $i$, are the outer cutting knives projecting from one side, in front of the rim of the wheel F. The piece for forming the staves is fed through the annular space formed by the outer periphery of the inner cutting wheel O, and inner circumference of the outer wheel F, the timber of any convenient length being forced through the aperture $j$ by the feed rollers $f^1$ $f^1$ and being maintained in a straight direction by pressure of its one edge against the guide strip $k$, whereby the cutters attached to the wheels O and F (driven from the drum as described) plane or dress the inner and outer faces of the stave, which (or rather the piece being fed from which it is afterward cut) passing through the annular space between the dressing wheels, is led on to a short small table piece $l$, that, as it travels on or over, serves as a bearing surface for the inner face of the piece forming the stave, whose outer, or top surface (as the feed motion is being continued) sets in motion, by the friction between the surfaces, a wheel P, whose circumference is equal to the length of the stave, and which is made fast to a shaft $m$, that through a heart shaped cam $n$, at its one end, gives a perpendicular motion to the rod $p$, resting through a hook projection on the cam, the rod $p$, being connected at its lower end to a lever $q$, whose fulcrum, half way, or thereabout, is fixed to the framing, the inner end of the lever $q$ being attached to a frame Q Q, jointed in the middle (for altering the width if requisite to suit different widths of stave, which frame has a perpendicular motion like a saw gate through the operation of the cam, hooked rod and lever, as described, the stave in passing through the machine, by its friction against the wheel P, producing this action, the object of which is to raise and lower the jointer cutters M¹, M², that together with their motion pulleys $e^1$, $e^3$, are hung in upper arms forming part of the framing Q, Q, in an inclined position, to joint or give the requisite bevel to the edges of the stave, as it, or the piece out of which it is formed, passes through the machine; the peculiar vertical motion of the framing Q, Q, as produced by the heart or other suitable shaped cam, serving to adjust the position of the jointer cutters so as to cut the stave on either edge of the requisite curve or slope in direction of its length, which it is evident will be effected as the jointer cutters are moved higher or lower during the travel of the stave, inasmuch as the cutting points are made closer or farther apart as required; the cam $n$, which makes one revolution in the length of the stave, producing the required bilge in the center, and the jointer cutters M¹ M² being set a little out of a straight line with one another, as shown by the red intersecting lines in Fig. 1, so that the cutters are nearest in the front. Backlash of the cutters after passing the bilge of the stave will by this means be obviated.

Figs. 3 and 4 illustrate more clearly the action of the dressing and jointing cutters with the stave passing through.

The stave may be cut to its length from the timber thus dressed and jointed by means of a circular saw R depressed for performance of its cut and traveling lengthwise of the machine while cutting. This may be effected as follows—the timber after passing through the rollers $f^3$ depresses and carries the saw for a limited distance along with it, the shaft H of the saw being allowed to slide longitudinally and being formed of two lengths joined together at $z$; S is a swinging frame through arms of which the shaft H passes whereby it (the shaft) is allowed spring to admit of the saw R being depressed. The swinging frame S is attached by trunnions $r$ $r$ to the frame of the machine and further connected by a spring T thereto, which spring is intended to elevate the saw (situated between the arms of the swinging frame) from its depression. A bail U of any specified weight, inclining toward the spring T is fitted loosely at one end on the shaft H, outside of the swinging frame S, and extending over the swinging frame, is attached, beyond the other side thereof, to a spring V, which links at one end to the extremity of the shaft H, and, crossing the swinging frame, is attached to the arm thereof nearest the wheel P. The outer end of the bail U has a bent leg or arm W connected with it and dipping downward. This bent leg or arm crosses and bears against a lever $s$, at its lower extremity $x$, which lever $s$, working on a fulcrum $y$, is made of angular form, its upper leg extending over the off arm of the swinging frame S.

A¹ is an inclined or curved projection for moving sidewise the lever $s$ and bent leg W as they are pressed on or against its edge.

The operation is as follows: the distance from the saw R to the point of contact with the leg W measures the length of the stave to be cut; the timber after passing the rollers $f^3$ strikes the bent leg W and lever $s$ moving them along with it as well as the saw R, connected through shaft H with the bent leg W; the lever $s$ in thus moving presses on the swinging frame S and depresses the saw till the stave is cut when the motion sidewise given to the bent leg W and lever $s$, by their pressure on and travel against the inclined or curved projection A¹ places them at one side of, and releases them from, the timber, whereby they are allowed to fly back to their original position, the cut stave dropping down and the spring T raising the saw while the spring V (distended in the operation) collapses and returns the saw to its former position for a further similar action on the next succeeding stave, the flying back of the bent leg W drawing with it the lever $s$, and the bail U, in falling backward, throwing the said bent leg and lever to their previous situation in a line with the timber passing through the machine. This action of these devices is repeated for each succeeding stave being cut. The same action however, as regards the depression and travel lengthwise of the saw, may be produced by simple, or more perfect devices, on which I purpose experimenting and making the subject of a subsequent application for a patent, as the devices herein specified for operating the saw in the manner set forth may be found in practice somewhat inefficient.

What I claim as my invention and desire to secure by Letters Patent, is—

Jointing the staves by means of cutters M¹ M² set at an inclined position and converging toward one another in the front, the said cutters having a motion given them perpendicular to the stave for formation of the bilge or varying width of the stave by means of the cam $n$, framing Q, Q, and their accompanying parts, or devices equivalent thereto, operating substantially as specified.

DENNISON WOODCOCK.

Witnesses:
GEORGE H. BENNETT,
THOMAS J. CAFE.